(12) United States Patent
Masao

(10) Patent No.: US 8,417,724 B2
(45) Date of Patent: Apr. 9, 2013

(54) FILE SERVER FOR EXTRACTING AND DISPLAYING FILE LIST ON CLIENT, METHOD OF PROVIDING DISPLAY ON CLIENT, AND COMPUTER PROGRAM EXECUTABLE ON FILE SERVER

(75) Inventor: Nishimoto Masao, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 46 days.

(21) Appl. No.: 13/106,828

(22) Filed: May 12, 2011

(65) Prior Publication Data

US 2011/0282853 A1 Nov. 17, 2011

(30) Foreign Application Priority Data

May 12, 2010 (JP) ................................ 2010-110396

(51) Int. Cl.
*G06F 17/00* (2006.01)
(52) U.S. Cl.
USPC ............ 707/791; 707/802; 707/822; 707/828
(58) Field of Classification Search ........... 707/600–899
See application file for complete search history.

(56) References Cited

U.S. PATENT DOCUMENTS

| | | | |
|---|---|---|---|
| 6,804,799 B2 | 10/2004 | Zuraski, Jr. | |
| 7,668,842 B2 | 2/2010 | LaChapelle et al. | |
| 7,680,814 B2 | 3/2010 | Mercer et al. | |
| 7,970,923 B2 | 6/2011 | Pedersen et al. | |
| 7,991,803 B2 | 8/2011 | Mercer et al. | |
| 8,151,323 B2 | 4/2012 | Harris et al. | |
| 8,280,920 B2 | 10/2012 | Mercer et al. | |
| 2002/0199151 A1 | 12/2002 | Zuraski, Jr. | |
| 2006/0020609 A1 | 1/2006 | LaChapelle et al. | |
| 2006/0265403 A1 | 11/2006 | Mercer et al. | |
| 2007/0038689 A1* | 2/2007 | Shinkai ......................... 707/205 |
| 2007/0244987 A1 | 10/2007 | Pedersen et al. | |
| 2007/0245409 A1 | 10/2007 | Harris et al. | |
| 2009/0240750 A1 | 9/2009 | Seo | |
| 2010/0023582 A1 | 1/2010 | Pedersen et al. | |
| 2010/0114986 A1 | 5/2010 | Mercer et al. | |
| 2011/0218998 A1 | 9/2011 | Mercer et al. | |

FOREIGN PATENT DOCUMENTS

| | | |
|---|---|---|
| CN | 1522410 A | 8/2004 |
| CN | 101208653 A | 6/2008 |
| CN | 101473628 A | 7/2009 |
| CN | 101546337 A | 9/2009 |
| JP | 2011-0175230 | 7/1999 |
| JP | 2011-0288426 | 10/1999 |

(Continued)

*Primary Examiner* — Isaac M Woo
(74) *Attorney, Agent, or Firm* — Jordan IP Law, LLC

(57) ABSTRACT

A file server for displaying, on a client, files to be retrieved, a method of providing a display on the client, and a computer program product with program instructions executable on the file server. The number of files to be displayed and start point information related to the start point of a file list to be extracted is acquired from a client, and a file list is extracted from files stored as a partitioned data set in a storage device based on the number of files and start point information acquired. The numbers of preceding and succeeding files stored before and behind the extracted file list are calculated, the calculated numbers of the preceding and succeeding files and the extracted file list are sent to the client. The client displays the file list and the received numbers of remaining files before and behind the received file list, respectively.

13 Claims, 11 Drawing Sheets

FOREIGN PATENT DOCUMENTS

| | | |
|---|---|---|
| JP | 2000-0207403 | 7/2000 |
| JP | 2000-0510978 | 8/2000 |
| JP | 2001-331362 A | 11/2001 |
| JP | 2003-0177950 | 6/2003 |
| JP | 2005-0081275 | 1/2005 |
| JP | 2006-0119395 | 5/2006 |
| JP | 2007-0282229 | 10/2007 |
| JP | 2008-0159047 | 7/2008 |

* cited by examiner

| 71 | 72 | 73 | 74 | 75 |
|---|---|---|---|---|
| FORWARD | BACKWARD | FILE NAME | NUMBER OF FILES | INCLUDED |

FIG. 7a

| 76 | 77 | 78 | | |
|---|---|---|---|---|
| NUMBER OF PRECEDING FILES | NUMBER OF SUCCEEDING FILES | FILE NAME 1 | FILE NAME 2 | ... FILE NAME N |

FIG. 7b

FILE SERVER FOR EXTRACTING AND DISPLAYING FILE LIST ON CLIENT, METHOD OF PROVIDING DISPLAY ON CLIENT, AND COMPUTER PROGRAM EXECUTABLE ON FILE SERVER

FIELD OF THE INVENTION

The present invention relates to a file server for extracting a desired file list from a plurality of stored files and displaying the file list on a client, a method of providing a display on the client, and a computer program product with a program executable on the file server.

BACKGROUND OF THE INVENTION

With the rapid development of the Internet technology, a file stored in a given file server can easily be searched for and extracted if the file server is connected to the Internet. On the other hand, the number of files to be retrieved increases, and it takes considerable time to conduct a search and provide a display in proportion to the number of files stored on the file server.

In order to reduce the time that elapses before the search result is displayed, a known file display system generates, as a new output file, a file extracted with a start and an end of displayable data indicated and outputs the file to a device capable of providing the display. This can output only the output file needed to be displayed to the device capable of providing the display, enabling reduction in the time that elapses before the search result is displayed.

SUMMARY OF THE INVENTION

However, this known file display system always has to access a file server in order, to generate a new output file when displaying a newly searched for file. Therefore, there arises a problem that when the number of files stored on the file server is enormous, it can still take considerable time to display the result of a search for the file.

The present invention has been made in view of the above situation, and it provides a file server capable of displaying, on a client, a file list to be retrieved in a relatively short time even if the number of files stored is enormous, a method of providing a display on the client, and a computer program product with a computer program executable on the file server.

In order to achieve the above object, according to a first embodiment, there is provided a file server for extracting a desired file list from a plurality of stored files and sending the file to a client, comprising: acquisition means for acquiring the number of files to be displayed and start point information related to the start point of a file list to be extracted; extraction means for extracting a file list on the basis of the acquired number of files and start point information from files stored as a partitioned data set in a storage device; calculation means for calculating the numbers of preceding and succeeding files respectively stored before and behind the extracted file list; and result sending means for sending the client the respective calculated numbers of preceding and succeeding files and the extracted file list.

The file server according to a second embodiment is based on the first embodiment and further comprises cache storage means for storing, in a cache memory, a total file list in which the file names of files stored as a partitioned data set in the storage device are sorted, wherein the extraction means extracts a file list from the cache memory based on the number of files and start point information acquired.

The file server according to a third embodiment is based on the second embodiment, wherein when an update instruction of the cache memory is acquired in addition to the number of files and start point information acquired, a total file list in which the file names of the files stored as the partitioned data set in the storage device are presorted and stored in the cache memory.

The file server according to a fourth embodiment is based on the first embodiment, wherein when the first file name in the file list and information indicative of forward search are acquired as start point information, a new file list is extracted based on the acquired start point information, and the extracted file list is sent to the client.

The file server according to a fifth embodiment is based on the first embodiment, wherein when the last file name in the file list and information indicative of backward search are acquired as start point information, new file list is extracted based on the acquired start point information, and the extracted file list is sent to the client.

The file server according to a sixth embodiment is based on the second embodiment, and further comprises determination means which, when a character string is included in the start point information, determines whether there is a file name that exactly matches or prefix matches the character string, wherein when the determination means determines that there is a file name that exactly matches or prefix matches the character string, a file list having the existing file name as a start point is extracted, or when the determination means determines that there is no file name that exactly matches or prefix matches the character string, a file list in which a file name present next to the character string when a file name group including the character string as a file name is sorted becomes the start point is extracted.

According to a seventh embodiment, there is provided a method of extracting a desired file list from a plurality of stored files and sending the file list to a client, comprising: acquiring the number of files to be displayed and start point information related to the start point of a file list to be extracted; extracting a file list on the basis of the acquired number of files and start point information from files stored as a partitioned data set in a storage device; calculating the numbers of preceding and succeeding files respectively stored before and behind the extracted file list; and sending the client the respective numbers of preceding and succeeding files calculated and the extracted file list.

The method according to an eighth embodiment is based on the seventh embodiment, and further comprises storing, in a cache memory, a total file list in which the file names of files stored as a partitioned data set in the storage device are sorted, wherein a file list is extracted from the cache memory based on the number of files and start point information acquired.

The method according to a ninth embodiment is based on the eighth embodiment, wherein when an update instruction of the cache memory is acquired in addition to the number of files and start point information acquired, a total file list in which the file names of the files stored as the partitioned data set in the storage device are presorted and stored in the cache memory.

The method according to a tenth embodiment is based on the seventh embodiment, wherein when the first file name in the file list and information indicative of forward search are acquired as start point information, a new file list is extracted based on the acquired start point information, and the extracted file list is sent to the client.

The method according to an eleventh embodiment is based on the seventh embodiment, wherein when the last file name in the file list and information indicative of backward search are acquired as start point information, a new file list is extracted based on the acquired start point information, and the extracted file list is sent to the client.

The method according to a twelfth embodiment is based on the eighth embodiment, and further comprises determining, when a character string is included in the start point information, whether there is a file name that exactly matches or prefix matches the character string, wherein when it is determined that there is a file name that exactly matches or prefix matches the character string, a file list having the existing file name as a start point is extracted, or when it is determined that there is no file name that exactly matches or prefix matches the character string, a file list in which a file name present next to the character string when a file name group including the character string as a file name is sorted becomes the start point is extracted.

According to a thirteenth embodiment, there is provided a computer program product comprising a computer-readable storage device having encoded thereon a program of instructions executable on a file server for extracting a desired file list from a plurality of stored files and sending the file list to a client, comprising: program instructions for acquiring the number of files to be displayed and start point information related to the start point of a file list to be extracted; program instructions for extracting a file list on the basis of the acquired number of files and start point information from files stored as a partitioned data set in a storage device; program instructions for calculating the numbers of preceding and succeeding files respectively stored before and behind the extracted file list; and program instructions for sending the client the respective numbers of preceding and succeeding files calculated and the extracted file list.

The computer program product according to a fourteenth embodiment is based on the thirteenth, embodiment, wherein when the first file name in the file list and information indicative of forward search are acquired as start point information, the computer program causes the file server to function as means for extracting a new file list based on the acquired start point information and sending the extracted file list to the client.

The computer program product according to a fifteenth embodiment is based on the thirteenth embodiment, wherein when the last file name in the file list and information indicative of backward search are acquired as start point information, the computer program causes the file server to function as means for extracting a new file list based on the acquired start point information and sending the extracted file list to the client.

The computer program product according to a sixteenth embodiment is based on the thirteenth embodiment, wherein a character string is included in the start point information, the computer program causes the file server to function as: program instructions for determining whether there is a file name that exactly matches or prefix matches the character string; program instructions for, when the determination means determines that there is a file name that exactly matches or prefix matches the character string, extracting a file list having the existing file name as a start point; and program instructions for, when the determination means determines that there is no file name that exactly matches or prefix matches the character string, extracting a file list in which a file name present next to the character string in a sorted file name group including the character string as a file name becomes the start point.

According to the present embodiment, since the number of files to be displayed on the client can be specified, a minimum file list required to search for files to be retrieved has only to be extracted and sent, enabling significant reduction in time that elapses before the extracted file list is displayed. Further, since the start point information for extracting a file list can be specified, the extraction range of files can be narrowed down, enabling reduction in time required to extract a necessary file list.

BRIEF DESCRIPTION OF THE DRAWINGS

FIGS. 7a and 7b are diagrams illustrating the structure of data the file server sends and receives according to the first embodiment of the present invention;

DETAILED DESCRIPTION OF THE INVENTION

Figure 1:
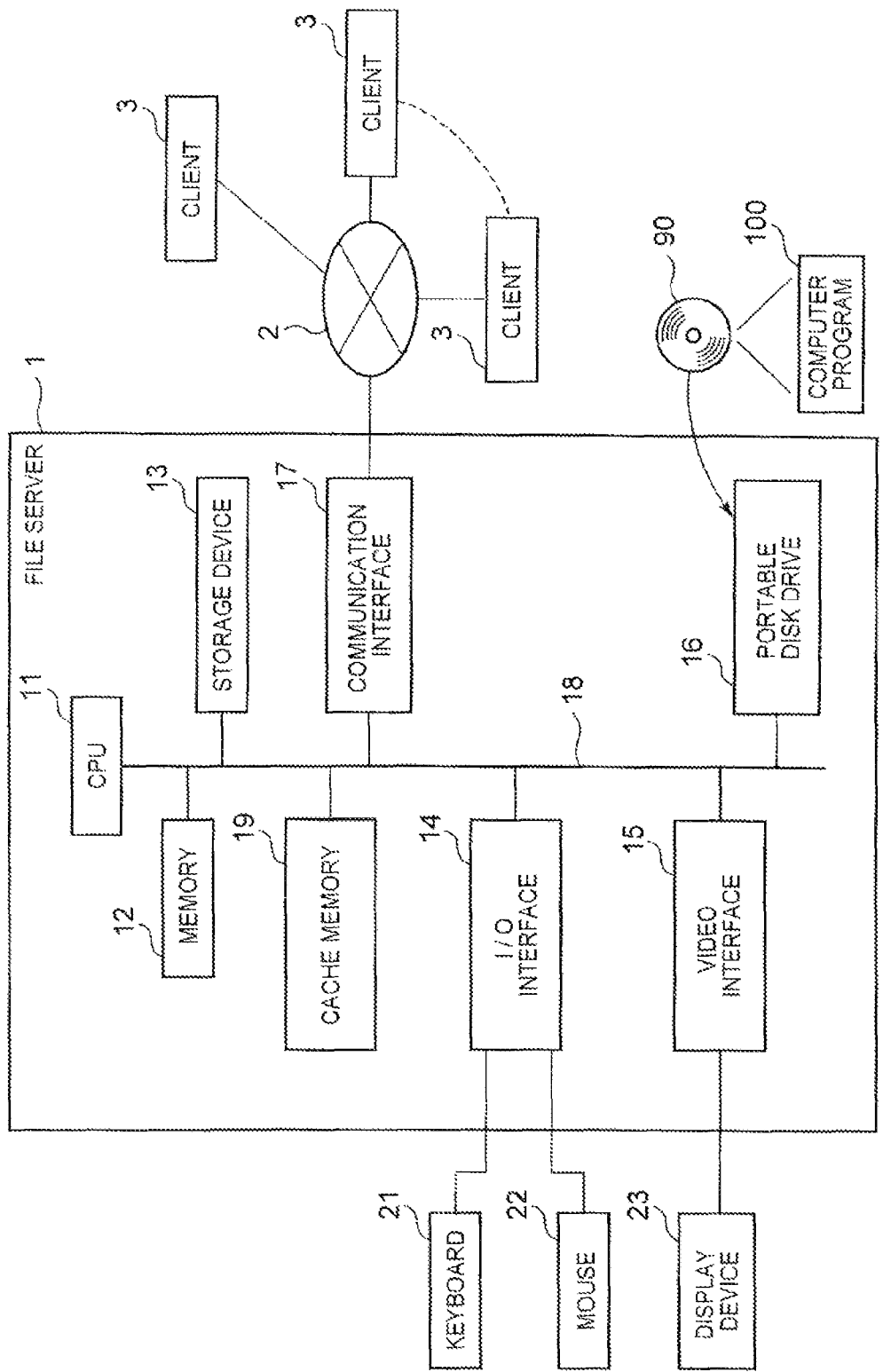
FIG. 1 is a block diagram showing a configuration example of a file display system including a file server according to a first embodiment of the present invention.

Referring now to the accompanying drawings, description will be specifically given of a file server for extracting a desired file list from a plurality of stored files and displaying the file list on a client, a method of providing a display on the client, and a computer program product embodying a computer program executable on the client according to preferred embodiments of the present invention. The following embodiments are not intended to limit the scope of the invention described in the appended claims, and not all the combinations of features described in the embodiments are requisites as resolving means of the present invention.

Further, the present invention can be carried out in a variety of different modes, and should not be limited to the contents of description of the embodiments. Note that the same reference numerals are employed throughout the embodiments to denote the same elements.

The following embodiments will describe a file display system in a client-server arrangement, which introduces a computer program into a computer system. As will be apparent to those skilled in the art, part of the present invention can be implemented as a computer program executable on a computer. Therefore, the present invention can take the form of an embodiment as the hardware of a file server in a client-server computer system, an embodiment as computer program product embodying software, or an embodiment as a system embodying a combination of software and hardware. The computer program can be recorded on a recording medium readable by any computer, such as a hard disk, a DVD, a CD, an optical storage device or a magnetic storage device.

According to the embodiments of the present invention, since the number of files to be displayed on a client can be specified, it is only necessary to extract and send a minimum file list required to search for files to be retrieved, enabling significant reduction in time that elapses before the extracted file list is displayed. Further, since start point information for extracting a file list can be specified, the extraction range of files can be narrowed down, enabling reduction in time required to extract a necessary file list.

FIG. 1 is a block diagram showing a configuration example of a file display system including a file server according to a first embodiment of the present invention. The file display system according to the first embodiment of the present invention is such that a file server 1, on which files to be retrieved are stored, and plural clients 3, 3, . . . are connected to be able to perform data communication with each other through a network 2. The file server 1 receives search conditions from any client 3, and sends the extraction result to the client 3 which is the source of the search conditions.

According to one embodiment, the file server 1 is configured to include at least a CPU (Central Processing Unit) 11, a memory 12, a storage device 13, an I/O interface 14, a video interface 15, a portable disk drive 16, a communication interface 17 and an internal bus 18 for connecting the above hardware components.

The CPU 11 is connected to each of the above-mentioned hardware components of the file server 1 through the internal bus 18 to control the operation of each of the above-mentioned hardware components and execute various software functions according to a computer program 100 stored in the storage device 13. The memory 12 is configured as a volatile memory, such as SRAM or SDRAM. Upon running the computer program 100, a load module is loaded into the memory 12 to store temporary data and the like generated during execution of the computer program 100.

The storage device 13 is configured as a built-in fixed type storage unit (hard disk), a ROM, or the like. The computer program 100 stored in the storage device 13 is downloaded from a portable recording medium 90, such as a DVD or a CD-ROM, on which the program and information such as data are recorded, through the portable disk drive 16, and during the execution, loaded from the storage device 13 into the memory 12. Of course, the computer program may be downloaded from an external computer connected to the network 2 through the communication interface 17.

The storage device 13 stores files to be retrieved as a partitioned data set. Thus, each file is stored as a member of the partitioned data set. When a file list is displayed on a client 3, a number of displayable members are extracted sequentially as a file list.

A cache memory 19 may also be provided separately from the storage device 13. The file names of the files stored in the storage device 13 as the partitioned data set are so presorted that the files will be stored as a total file list in the cache memory 19 allowing faster access to a file list. This is because the time required to extract a file list based on the number of files and the start point information can be reduced.

The communication interface 17 is connected to the internal bus 18 and further to the external network 2 such as the Internet, a LAN or a WAN to enable data communication with the clients 3, 3, . . . as external computers. The clients 3, 3, . . . include, but are not particularly limited to, a personal computer, a potable terminal and a cellular phone.

The I/O interface 14 is connected to data input device such as a keyboard 21 and/or a mouse 22 to accept input of data. The video interface 15 is connected to a display device 23 such as a CRT monitor or an LCD to display given images.

Figure 2:
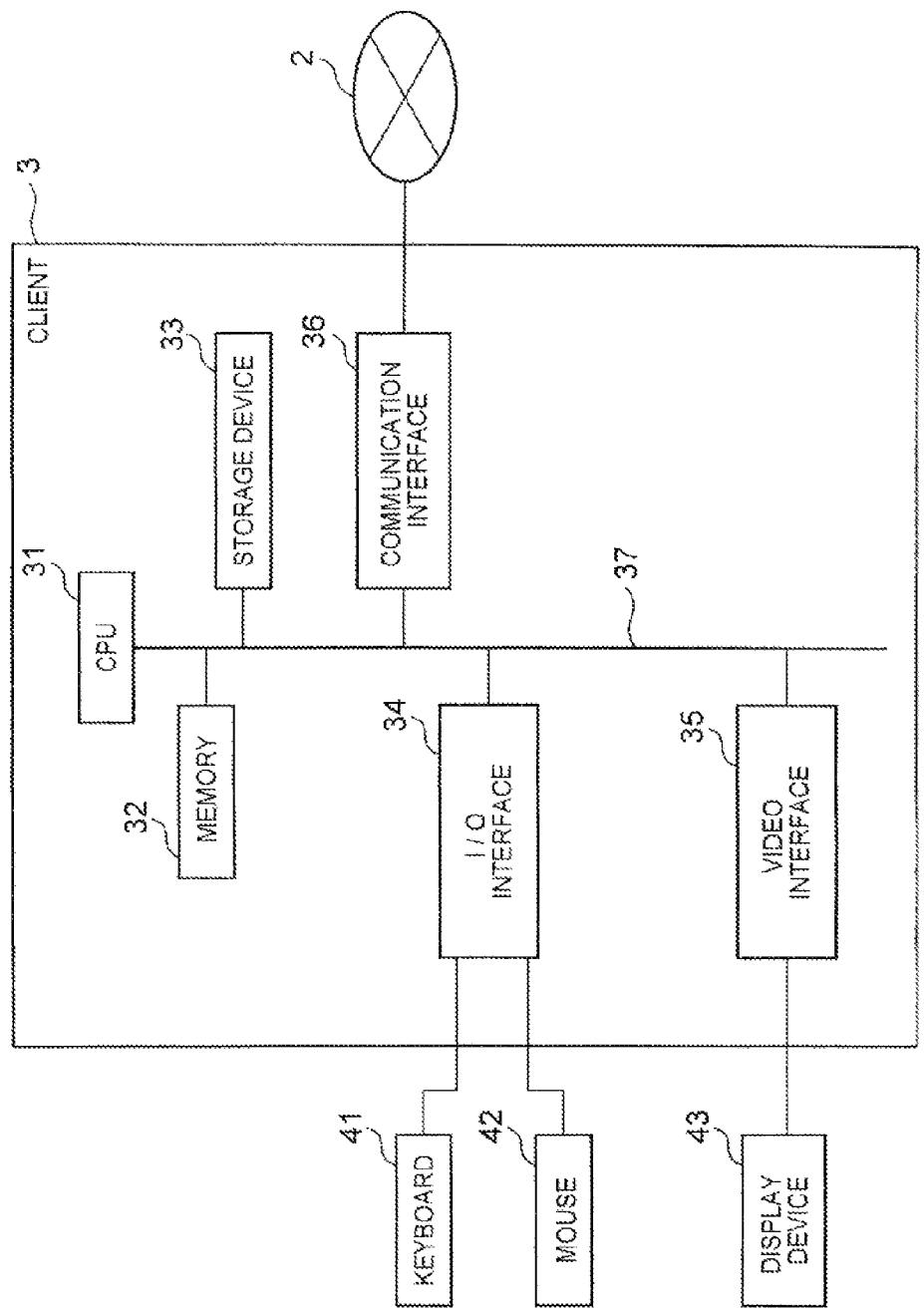
FIG. 2 is a block diagram showing a configuration example of a client in the file display system according to the first embodiment of the present invention.

FIG. 2 is a block diagram showing a configuration example of a client 3 in the file display system according to the first embodiment of the present invention. The client 3, according to the first embodiment of the present invention, is configured to include at least a CPU (Central Processing Unit) 31, a memory 32, a storage device 33, an I/O interface 34, a video interface 35, communication interface 36 and an internal bus 37 for connecting the above-mentioned hardware components.

The CPU 31 is connected to each of the above-mentioned hardware components of the client 3 through the internal bus 37 to control the operation of each of the above-mentioned hardware components and execute various software functions according to a computer program stored in the storage device 33. The memory 32 is configured as a volatile memory, such as SRAM or SDRAM. Upon running the computer program, a load module is loaded into the memory 32 to store temporary data and the like generated during execution of the computer program.

The storage device 33 is configured as a built-in fixed type storage unit (hard disk), a ROM, or the like. The computer program stored in the storage device 33 may be downloaded from a portable recording medium, such as a DVD or a CD-ROM, on which the program and information such as data are recorded, or from an external computer connected to the network 2 through the communication interface 36. Upon execution, the stored computer program is loaded from the storage device 33 into the memory 32.

The communication interface 36 is connected to the internal bus 37 and further to the external network 2 such as the Internet, a LAN or a WAN to enable data communication with the server 1 and the like as external computers.

The I/O interface 34 is connected to data input device such as a keyboard 41 and/or a mouse 42 to accept input of data. The video interface 35 is connected to a display device 43 such as a CRT monitor or an LCD to display given images.

Figure 3:
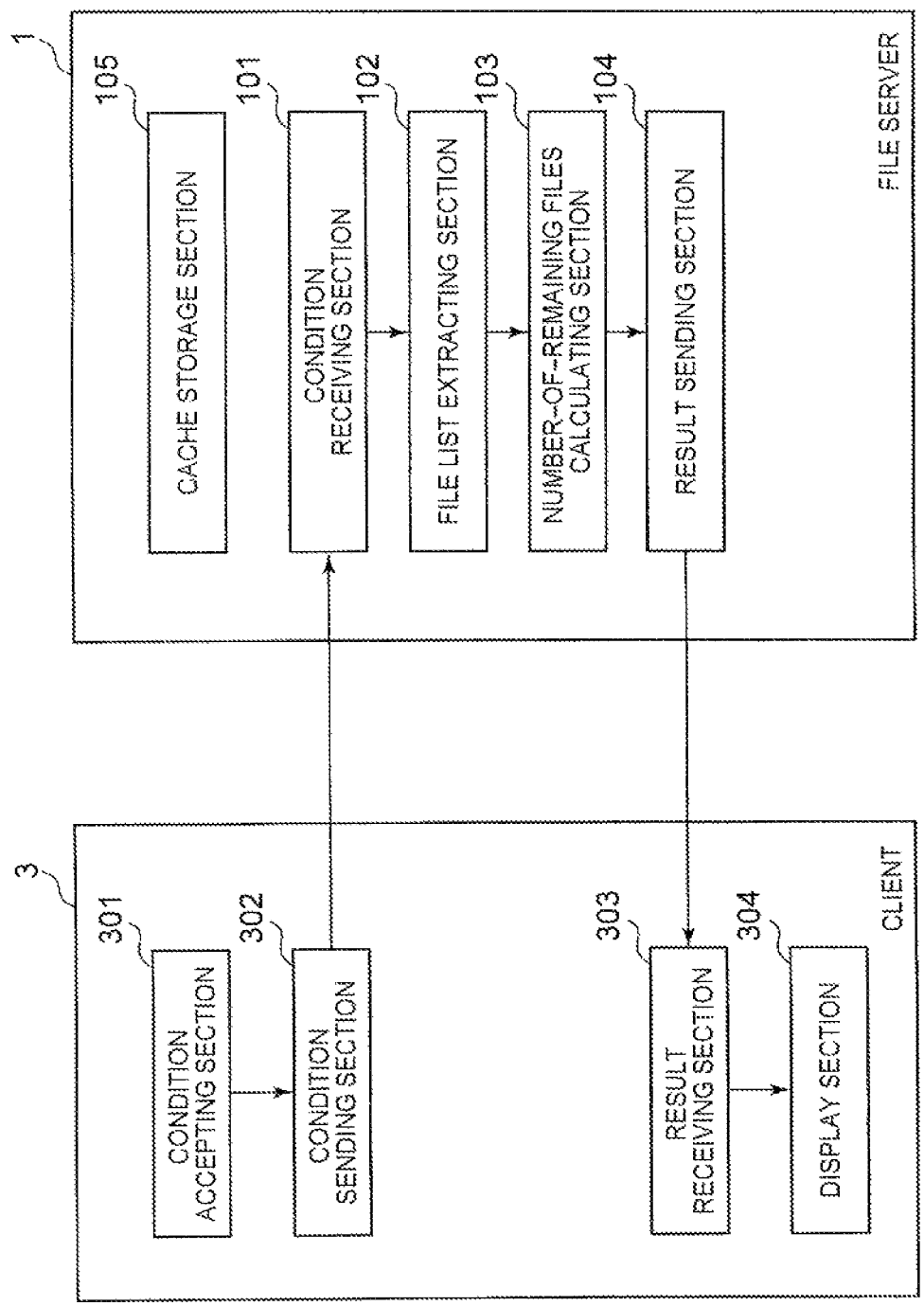
FIG. 3 is a functional block diagram showing the operation of the file display system including the file server according to the first embodiment of the present invention.

The operation of the file display system thus configured will be described below. FIG. 3 is a functional block diagram showing the operation of the file display system including the file server 1 according to the first embodiment of the present invention.

In FIG. 3, a condition accepting section 301 of the client 3 accepts input of conditions for extracting files to be displayed from the file server 1 through the keyboard 41, the mouse 42 or the like. Specifically, input of the number of files displayable on the client 3, i.e., input of the number of file names displayable on a page-by-page basis (hereinafter, referred to as the number of files) and information on the start point used when a file name group is extracted as a file list (hereinafter referred to as start point information) is accepted as conditions (search conditions) for extracting a file list to be displayed.

A condition sending section 302 sends the file server 1 the accepted input conditions. A condition receiving section (acquisition means) 101 of the file server 1 receives the conditions sent from the client 3, i.e., the number of files and the start point information.

No particular limitation is imposed upon the start point information as long as the start point of the file list to be extracted can be specified. For example, the start point information includes at least a file name as the start point. The start point information also includes information for making a distinction between whether to search for files forward from the specified file name (hereinafter referred to as forward search) and whether to search for files backward (hereinafter referred to as backward search). This is because the file server 1 side cannot distinguish between the forward search and the backward search from the specified file name alone.

Based on the number of files and the start point information received, a file list extracting section (extraction means) 102 extracts a file list from a file name group stored in the storage device 13 as a partitioned data set. Specifically, it extracts, as a file list, file names for the number of files received in order from the specified file name based on the start point information received and in the specified direction.

Figure 4:
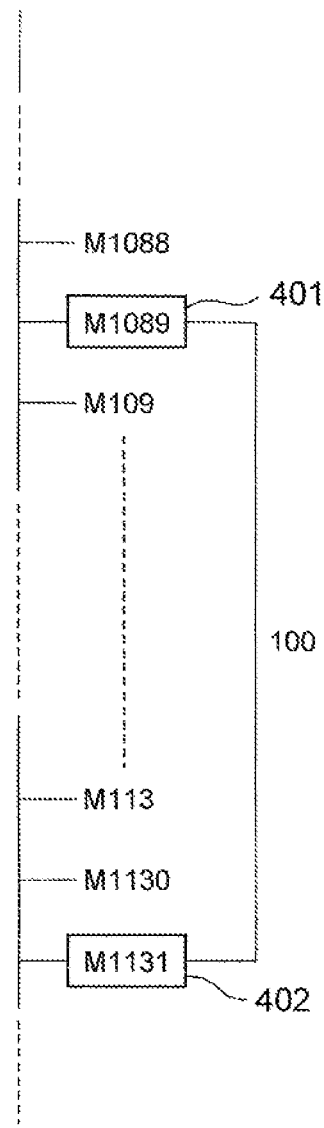
FIG. 4 is a diagram illustrating file list extraction performed by the file server according to the first embodiment of the present invention.

FIG. 4 is a diagram illustrating file list extraction performed by the file server 1 according to the first embodiment of the present invention. In the example of FIG. 4, a file name group included in a partitioned data set "USER.PDSE10K" is shown. Only from the number of files "100" and file name "M1089" as the start point information, it is not clear whether to search for 100 files forward or backward from a position 401 at which the file name "M1089" is specified in order to extract a file list. In the example of FIG. 4, the forward direction is the default direction, and, therefore, it is assumed that "forward search" is received as the start point information, and a forward search is conducted for 100 files, based on the start point information, from the position 401 at which the file name "M1089" is specified, and a position 402 of the last file name "M1131" becomes the last line of the file list to be extracted.

Returning to FIG. 3, a number-of-remaining files calculating section (calculation means) 103 calculates how many files remain unextracted before and behind the extracted file list. For example, when the file names are set to natural numbers like 1, 2, 3, . . . , 300, if the extracted file list contains file names from 201 to 250, the calculation can be made such that the number of remaining files before the file list is '200' and the number of remaining files behind the file list is '50.'

When the number of remaining files is calculated, the first file and the last file in the file list may be either included or excluded. Use of either method may be included in the start point information and accepted by the client 3, or either of the methods may be set by default.

Further, when the cache memory 19 is used, a cache storage section 105 stores, in the cache memory 19, a total file list in which the file names of the files stored as the partitioned data set are presorted based on the number of files and the start point information received. The file list extracting section 102 extracts a file list based on the number of files and the start point information from the file list presorted and stored in the cache memory 19. Then, the number-of-remaining files calculating section 103 calculates the number of files that remains unextracted before and behind the file list extracted from the cache memory 19.

The result sending section 104 sends the client 3 the extracted file list, the number of remaining files before the file list and the number of remaining files behind the file list. A result receiving section 303 of the client 3 receives the file list, the number of remaining files before the file list, and the number of remaining files behind the file list, and a display section 304 displays the file names as the file list, the number of preceding files immediately before the head (first line) of the file name group, and the number of succeeding files immediately behind the end (last line) of the file name group.

Figure 5:
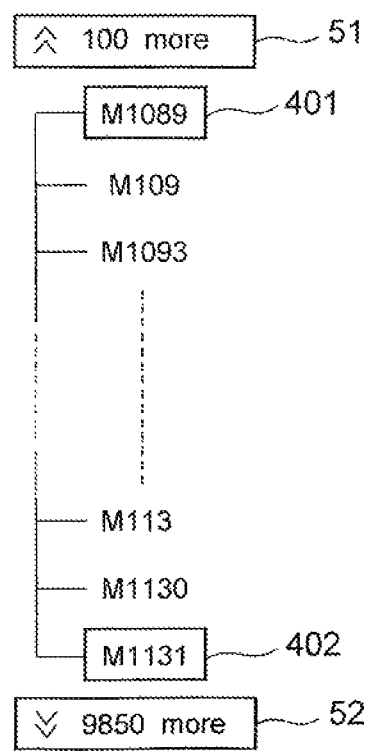
FIG. 5 is a diagram illustrating a file list displayed on the client in the file display system according to the first embodiment of the present invention.

FIG. 5 is a diagram illustrating a file list displayed on the client 3 in the file display system according to the first embodiment of the present invention. In FIG. 5, a display is so provided that the number of remaining files before and behind the file list is added to the file list extracted in FIG. 4. In this example, the number of files in the extracted file list is the number of file names displayable on one page.

In other words, the client 3 accepts input of the number of files "100," file name "M1089" as the start point information, and information "forward search" indicative of forward search. Then, upon receipt of the input, the file server 1 searches for 100 files forward from the position 401 at which the file name "M1089" is specified. In this case, the position 402 of the last file name "M1131" in the file list becomes the end of the file list to be extracted. Then, the number of preceding files "100" is displayed in a number-of-preceding files displaying area 51 immediately before the file name "M1089" in the first line (at the head), and the number of succeeding files "9850" is displayed in a number-of-succeeding file displaying area 52 immediately behind the file name "M1131" in the last line (at the end).

When a desired file name does not exist in the file list displayed, the file list is updated and displayed. For example, when a further backward search is conducted, the client 3 accepts new input of the file name in the first line of the file list and information indicative of backward search as the start point information, and the file server 1 receives the input. This enables the file server 1 to extract a new file list corresponding to the previous page of the currently displayed page based on the start point information received, and hence, enables the client 3 to display a file list on a page-by-page basis.

When a further forward search is conducted, the client 3 accepts new input of the file name in the last line of the file list and information indicative of forward search as the start point information, and the file server 1 receives the input. This enables the file server 1 to extract a new file list corresponding to the following page of the currently displayed page based on the start point information received, and hence, enables the client 3 to display a file list on a page-by-page basis.

Figure 6:
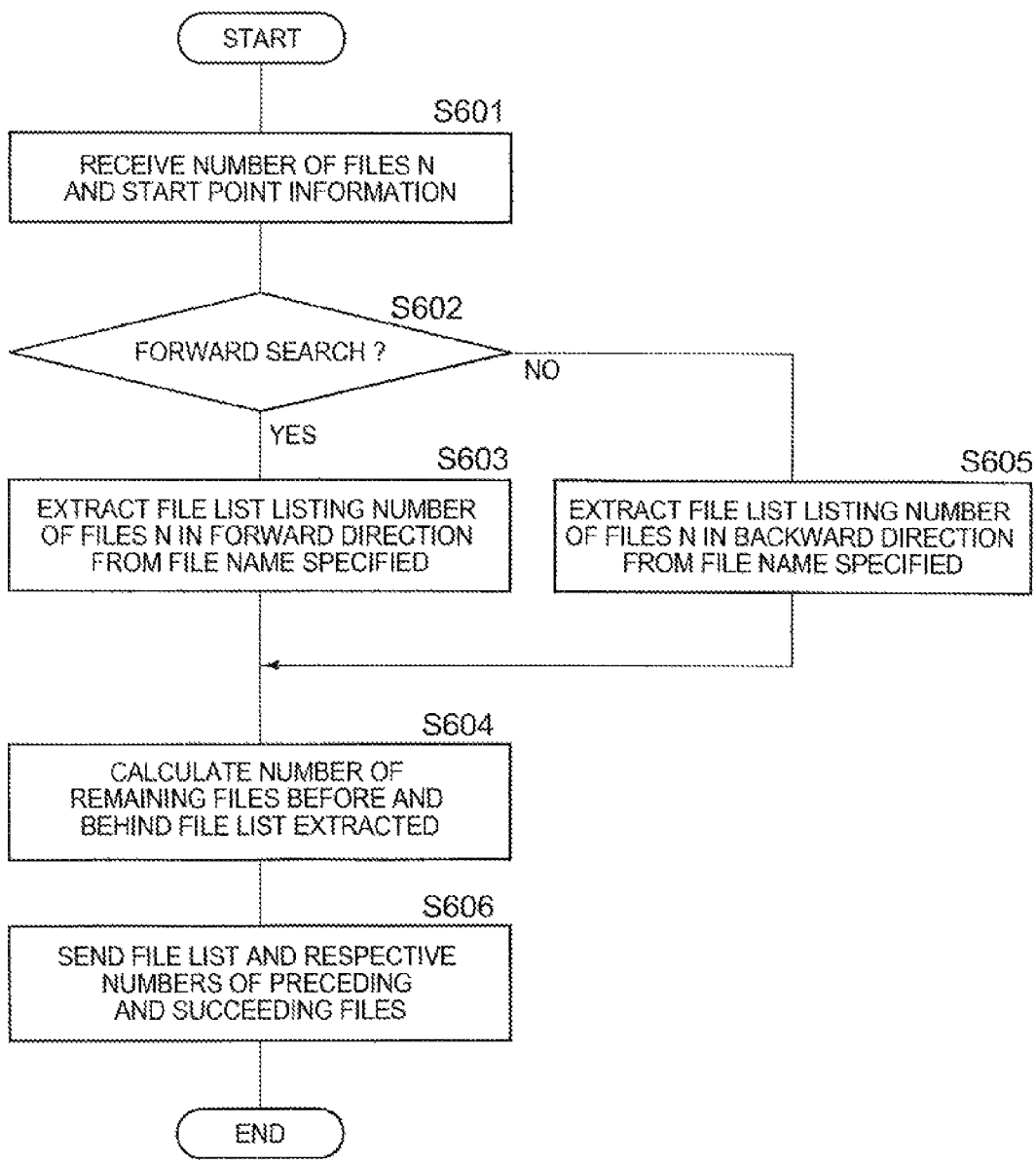
FIG. 6 is a flowchart showing a procedure performed by a CPU of the file server according to the first embodiment of the present invention.

FIG. 6 is a flowchart showing a procedure performed by the CPU 11 of the file server 1 according to the first embodiment of the present invention. The CPU 11 of the file server 1 receives the number of files N and the start point information from the client 3 (step S601). FIGS. 7a and 7b are diagrams illustrating the structure of data the file server 1 sends and receives according to the first embodiment of the present invention.

FIG. 7a is a diagram illustrating the data structure of the number of files N and the start point information received by the file server 1 from the client 3. As shown in FIG. 7a, the data received includes either flag information 71 indicative of forward search or flag information 72 indicative of backward search, file name 73 as the start point, and the number of files 74 to be extracted forward or backward from the start point of the file list, and if needed when the number of remaining files is calculated, flag information 75 indicating whether the files in the first and last lines of the file list are included.

Returning to FIG. 6, the CPU 11 of the file server 1 determines whether it is a forward search (step S602). If the CPU 11 determines that it is the forward search (YES in step S602), the CPU 11 extracts a file list comprising the number of files N received in the forward direction of the file name specified based on the start point information (step S603). The CPU 11 then calculates the number of remaining files before and behind the extracted file list (step S604).

If the CPU 11 of the file server 1 determines that it is not the forward search, i.e., that it is the backward search (NO in step S602), the CPU 11 extracts a file list comprising the number of files N received in the backward direction of the file name specified based on the start point information (step S605). The CPU 11 then calculates the number of remaining files before and behind the extracted file list (step S604).

When the number of remaining files is calculated, the first file and the last file in the file list may be either included or excluded. Use of either method may be included in the start point information and accepted by the client 3, or either of the methods may be set by default.

The CPU 11 sends the client 3 the extracted file list, the number of preceding files before the file list, and the number of succeeding files (step S606). FIG. 7b is a diagram illustrating the structure of data to be sent to the client 3 as a file list extracted by the file server 1.

As shown in FIG. 7b, a file list 78 including the extracted N file names together with the number of preceding files 76 and the number of succeeding files 77 calculated is sent to the client 3. According to one embodiment, the number of files N is set to the number of files displayable on a page-by-page basis, enabling a file list to be displayed on a page-by-page basis.

Note that when the cache memory 19 is used, there is a possibility that the file names of the files stored in the storage device 13 are inconsistent with the file names of the files stored in the cache memory 19 when the files stored in the storage device 13 are updated. Therefore, the client 3 has the ability to accept an update instruction of the cache memory 19. When the client 3 accepts the update instruction of the cache memory 19, the file server 1 receives the update instruction from the client 3, resorts the file names of the files stored in the storage device 33 as the partitioned data set at the time, and updates the total file list stored in the cache memory 19.

Thus, according to the first embodiment, since the number of files to be displayed on the client can be specified, a minimum file list required to search for files to be retrieved has only to be extracted and sent, enabling significant reduction in time that elapses before the extracted file list is displayed. Further, since the start point information for extracting a file list can be specified, the extraction range of files can be narrowed down, enabling reduction in time required to extract a necessary file list.

In the file display system according to the first embodiment, it is assumed that the start point of the file list can always be specified from the file name specified in the start point information, i.e., specifically that there is the specified file name. A second embodiment differs from the first embodiment in that there is no file name that matches the file name specified in the start point information. Since the configuration example and functional blocks of a file display system according to the second embodiment are the same as the configuration example and functional blocks of the file display system according to the first embodiment, the same reference numbers are assigned to omit redundant detailed description.

The condition accepting section 301 of the client 3 shown in FIG. 3 accepts input of a file name as the start point information. The start point information accepted includes a character string but no file name that matches the file name specified by the condition receiving section 101 of the file server 1 based on the start point information received is stored in the storage device 13.

In this case, when the file names of the files stored in the storage device 13 not including the file name (character string) included in the received start point information are sorted, a file name present next to the file name included in the start point information is specified as the start point. Of course, the start point is not limited to the file name following the file name included in the start point information, and it may be a file name immediately before the file name included in the start point information.

Figure 8:
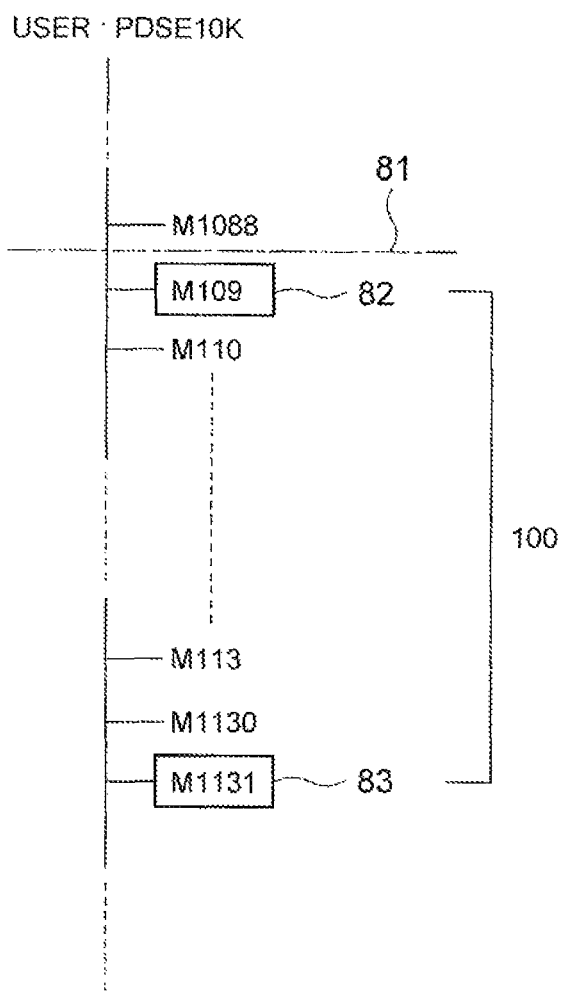
FIG. 8 is a diagram illustrating file list extraction performed by the file server according to a second embodiment of the present invention.

Based on the file name specified based on the number of files and the start point information received, the file list extracting section (extraction means) 102 extracts a file list from a file name group stored in the storage device 13 as a partitioned data set. FIG. 8 is a diagram illustrating file list extraction performed by the file server 1 according to the second embodiment of the present invention.

In the example of FIG. 8, a file name group included in a partitioned data set "USER.PDSE10K" is shown. Here, it is assumed that the number of files "100," file name "M1089" as the start point information, and information "forward search" indicative of forward search are received. In this case, since the file name "M1089" does not exist, the file names of the files, not including the file name "M1089", stored in the storage device 13 are sorted to identify a position where the file name "M1089" is supposed to exist.

In other words, the CPU 11 of the file server 1 specifies, as the start point, file name "M109" present next to position 81 where the file name "M1089" is supposed to exist, and searches for 100 files forward from position 82 of the specified file name "M109." As a result, position 83 of the last file name "M1131" becomes the last line of the file list to be extracted.

Thus, according to the second embodiment, even if a file name that matches the file name specified based on the start point information (exact match or prefix match) is not included in the file names of the files stored in the storage device 13 as the partitioned data set, since a start point for extracting a file list can be specified, the extraction range of files can be narrowed down, enabling reduction in time required to extract a necessary file list.

In the file display system including the file server 1 according to the first and second embodiments, the client 3 receives a file list in each case. A third embodiment differs from the first and second embodiments in that a file list is displayed by using the file list stored in the storage device 33 of the client 3 without being received from the file server 1 when unnecessary. Since the configuration example and functional blocks of a file display system including the file server 1 according to the third embodiment are the same as the configuration example and functional blocks of the file display system according to the first embodiment, the same reference numbers are assigned to omit redundant detailed description.

A file list received is stored in the storage device 33 of the client 3. The file list stored in the storage device 33 of the client 3 is stored in the data structure shown in FIG. 7a of the first embodiment. A file name in the first line of the file list is set as a backward discontinuous point, a file name in the last line is set as a forward discontinuous point, and the number of preceding files or the number of succeeding files is stored in association with each discontinuous point.

When the CPU 31 of the client 3 receives a new (another) file list from the file server 1, the CPU 31 performs the following processing as combining determination means, namely: the CPU 31 determines whether a file name immediately before the file name in the first line of the file list received is a discontinuous point in the file list stored in the storage device 33. If the CPU 31 determines that the file name is not a discontinuous point, the CPU 31 then determines whether the file list includes the immediately preceding file name. If the CPU 31 determines that the file list includes the immediately preceding file name, the CPU 31 combines the two file lists.

Likewise, when the CPU 31 receives a new (another) file list from the file server 1, the CPU 31 determines whether a file name immediately behind the file name in the last line of the file list received is a discontinuous point in the file list stored in the storage device 33. If determining that the file name is not a discontinuous point, the CPU 31 then determines whether the file list includes the immediately following file name. If determining that the file list includes the immediately following file name, the CPU 31 combines the two file lists.

Figure 9:
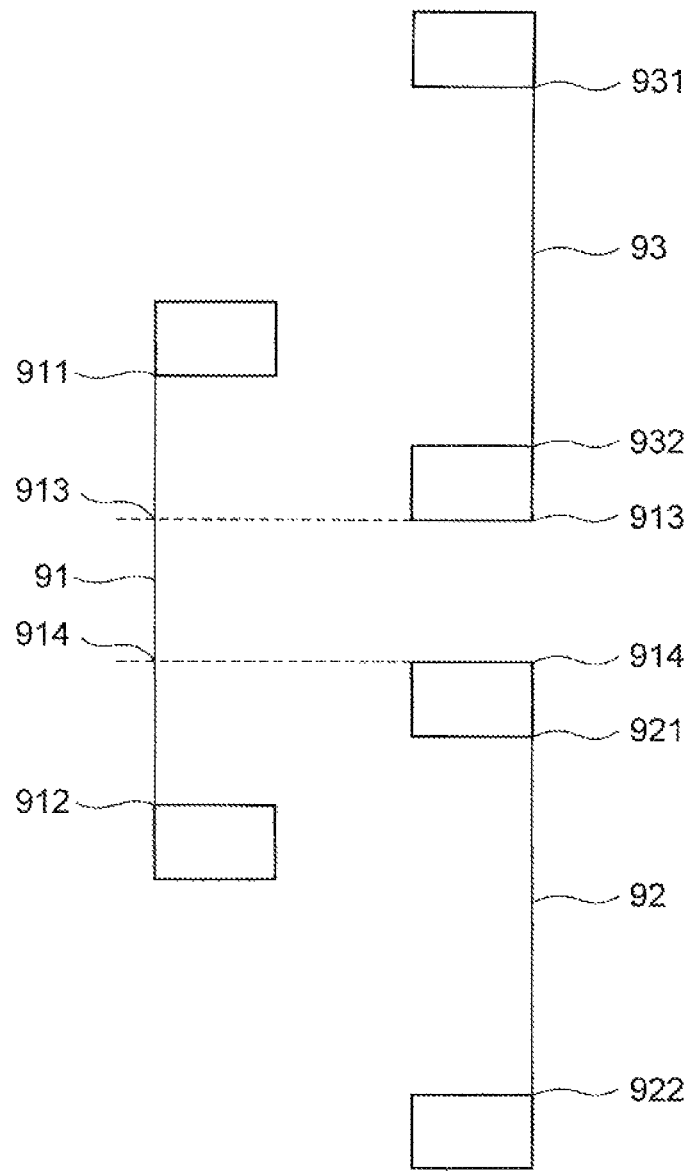
FIG. 9 is a diagram illustrating combining file lists in a file display system including a file server according to a third embodiment of the present invention when a file name immediately before or behind a file name in the first or last line of a file list received is not a discontinuous point in a file list stored in a storage device.
Figure 10:
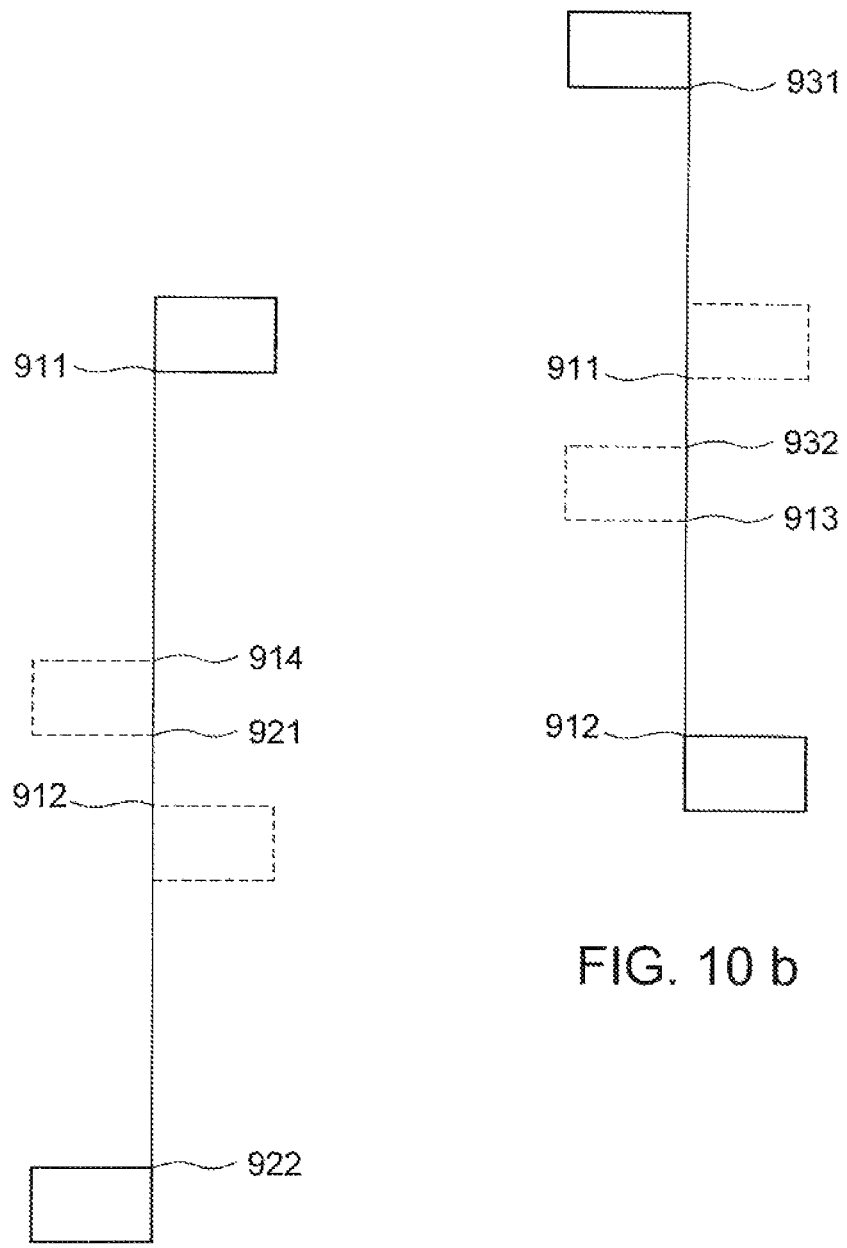
FIGS. 10a and 10b are diagrams illustrating combining file lists in the file display system including the file server according to the third embodiment of the present invention when a file name immediately before or behind a file name in the first or last line of the file list received is not a discontinuous point in the file list stored in the storage device.

FIG. 9 and FIGS. 10a and 10b are diagrams illustrating combining file lists when a file name immediately before or behind the file name in the first or last line of the file list received is not a discontinuous point in the file list stored in the storage device 33 in the file display system including the file server 1 according to the third embodiment of the present invention. When a new file list 92 is received from the file server 1, a file name 914 immediately before a file name 921 in the first line of the new file list 92 received is not a discontinuous point in a file list 91 stored in the storage device 33. In this case, since the file list 91 includes the file name 914 immediately before the file name 921 in the first line of the new file list 92 received, the file lists 91 and 92 necessarily include an overlapping range, so that the file lists 91 and 92 can be combined into one file list.

When the two file lists 91 and 92 are combined, a forward discontinuous point 912 in the file list 91 stored and the backward discontinuous point 921 in the new file list 92 received are deleted from the discontinuous points as shown in FIG. 10a. As a result, a backward discontinuous point 911 in the file list 91 stored becomes a backward discontinuous point in the combined file list and a forward discontinuous point 922 in the new file list 92 received becomes a forward discontinuous point in the combined file list.

Likewise, when a new file list 93 is received from the file server 1 as shown in FIG. 9, a file name 913 immediately behind a file name 932 in the last line of the file list 93 received is not a discontinuous point in the file list 91 stored in the storage device 33. In this case, since the file list 91 includes the file name 913 immediately behind the file name 932 in the last line of the new file list 93 received, the file lists 91 and 93 necessarily include an overlapping range, so that the file lists 91 and 93 can be combined into one file list.

When the two file lists 91 and 93 are combined, the backward discontinuous point 911 in the stored file list 91 and the forward discontinuous point 932 in the new file list 93 received are deleted from the discontinuous points as shown in FIG. 10b. As a result, the forward discontinuous point 912 in the file list 91 stored becomes the forward discontinuous point in the combined file list and a backward discontinuous point 931 in the new file list 93 received becomes the backward discontinuous point in the combined file list.

Further, when the CPU 31 of the client 3 receives a new file list from the file server 1, the CPU 31 determines whether a file name immediately before a file name in the first line of the file list received is a discontinuous point in the file list stored in the storage device 33. If the CPU 31 determines that the file name is a discontinuous point, the CPU 31 then determines whether a difference between the number of succeeding files of the forward discontinuous point in the file list stored and the number of files behind the forward discontinuous point in the new file list received matches the number of files in the newly received file list. If the CPU 31 determines that both match, the CPU 31 combines the two file lists.

Likewise, when determining that a file name immediately behind a file name in the last line of the file list received is a discontinuous point in the file list stored in the storage device 33, the CPU 31 then determines whether a difference between the number of preceding files of the backward discontinuous point in the file list stored and the number of preceding files of the backward discontinuous point in the newly received file list matches the number of files in the newly received file list. If the CPU 31 determines that both match, the CPU 31 combines the two file lists.

Thus, the file lists are combined. Here, suppose that a desired file name is not stored in the storage device 33 of the client 3. In this case, when a new file list is acquired, if any discontinuous point before or behind the combined file list does not exist in the new file list, it can be determined that the file name is not stored on the file server 1 as well. Further, when the desired file name is not stored in the storage device 33 of the client 3, if any discontinuous point does not exist within the range of the numbers of forward and backward files, the file list stored in the storage device 33 of the client 3 can be used as-is. In other words, there is no need to access the file server 1 in order to acquire a new file list.

Figure 11:
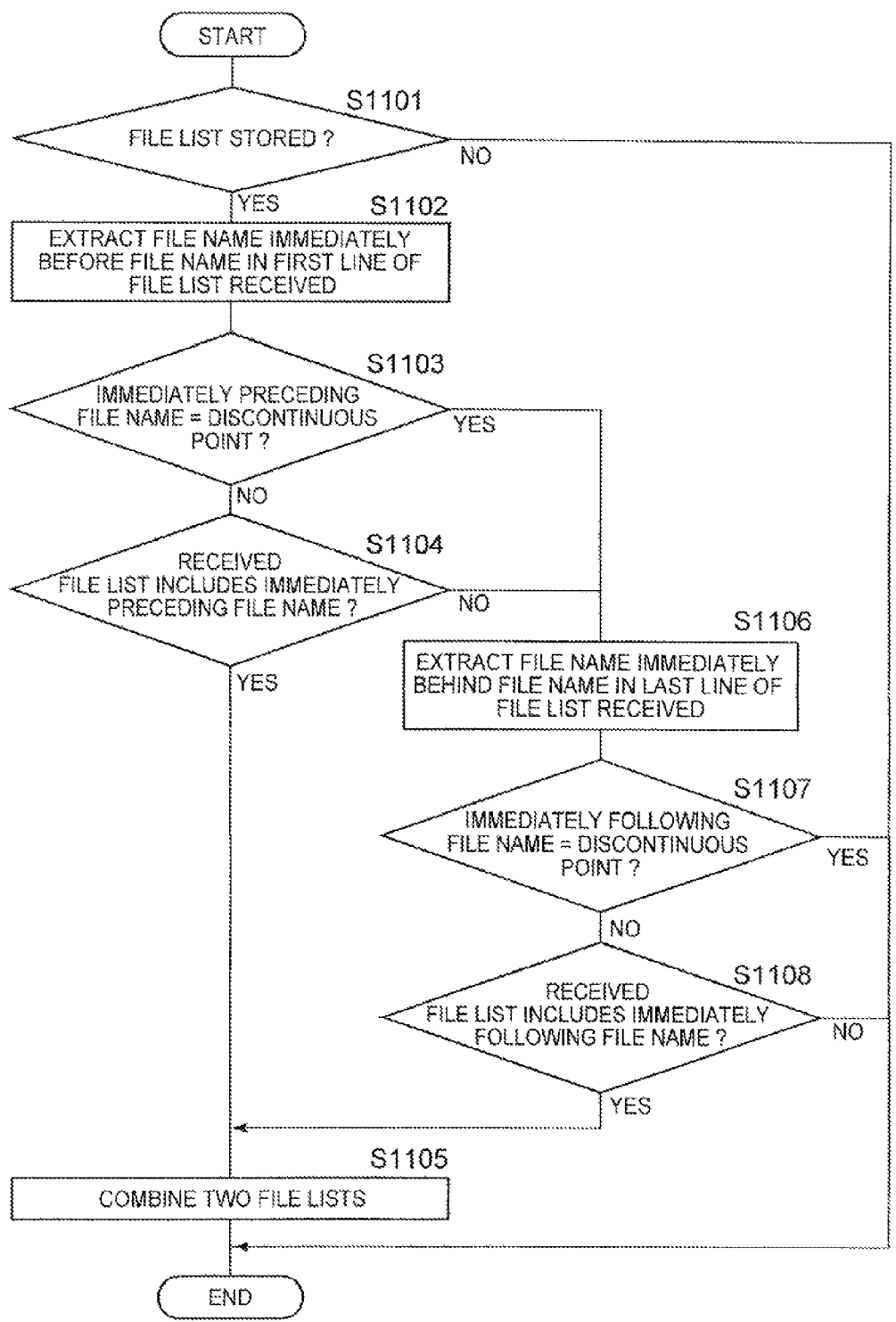
FIG. 11 is a flowchart showing a procedure for combining file lists performed by the CPU of the client according to the third embodiment of the present invention.

FIG. 11 is a flowchart showing a procedure for combining file lists performed by the CPU 31 of the client 3 according to the third embodiment of the present invention. The CPU 31 of the client 3 determines whether a file list previously received is stored in the storage device 33 of the client 3 (step S1101). If it determines that the file list is not stored (NO in step S1101), the CPU 31 determines that no file list to be combined exists and ends the processing.

If the CPU 31 determines that the file list is stored (YES in step S1101), the CPU 31 extracts, from the file server 1, a file name immediately before a file name in the first line of the received new file list (step S1102), and determines whether the immediately preceding file name extracted is a discontinuous point in the file list stored in the storage device 33 (step S1103). If the CPU 31 determines that it is not a discontinuous point (NO in step S1103), the CPU 31 then determines whether the received file list includes the immediately preceding file name (step S1104).

If the CPU 31 determines that the immediately preceding file name is included (YES in step S1104), the CPU 31 combines and stores the two file lists in the storage device 33 as one file list (step S1105). On the other hand, if the CPU 31 determines that it is a discontinuous point (YES in step S1103) or that the immediately preceding file name is not included (NO in step S1104), the CPU 31 extracts, from the file server 1, a file name immediately behind a file name in the last line of the new file list received (step S1106), and determines whether the immediately following file name extracted is a discontinuous point in the file list stored in the storage device 33 (step S1107). If the CPU 31 determines that it is not a discontinuous point (NO in step S1107), the CPU 31 then determines whether the received file list includes the immediately following file name (step S1108).

If the CPU 31 determines that the immediately following file name is included (YES in step S1108), the CPU 31 combines and stores the two file lists in the storage device 33 as one file list (step S1105). On the other hand, if the CPU 31 determines that it is a discontinuous point (YES in step S1107) or that the immediately following file name is not included (NO in step S1108), the CPU 31 ends the processing.

Thus, according to the third embodiment, since two or more file lists are combined and stored as one file list in the storage device 33 of the client 3, a file search can be conducted in some cases without acquiring a new file list from the file server 1, enabling significant reduction in time that elapses before a file list is displayed on the client 3.

Note that the present invention is not limited to the aforementioned embodiments, and various changes and modifications can be made within the scope of the present invention.

The invention claimed is:

1. A file server for extracting a desired file list from a plurality of stored files and sending the file list to a client, comprising:
    acquisition means for acquiring the number of files to be displayed and start point information identifying a start point of a file list to be extracted;
    extraction means for extracting a file list corresponding to the acquired number of files and start point information from files stored as a partitioned data set in a storage device;
    calculation means for calculating the numbers of preceding stored files before the extracted file list and succeeding stored files after the extracted file list;
    result sending means for sending the client the calculated numbers of preceding and succeeding files and the extracted file list; and
    cache storage means for storing, in a cache memory, a total file list in which file names of files stored as a partitioned data set in the storage device are sorted, wherein the extraction means extracts a file list from the cache memory based on the number of files and start point information acquired.

2. The file server according to claim 1, wherein when an update instruction of the cache memory is acquired in addition to the number of files and start point information acquired, the file names of the files stored as the partitioned data set in the storage device are sorted again and stored in the cache memory as a total file list.

3. The file server according to claim 1, wherein when the first file name in the file list and information indicative of forward search are acquired as start point information, a new file list is extracted based on the acquired start point information, and the extracted file list is sent to the client.

4. The file server according to claim 1, wherein when the last file name in the file list and information indicative of backward search are acquired as start point information, a new file list is extracted based on the acquired start point information, and the extracted file list is sent to the client.

5. The file server according to claim 1, further comprising:
    determination means which, when a character string is included in the start point information, determines whether there is a file name that exactly matches or prefix matches the character string,
    wherein when the determination means determines that there is a file name that exactly matches or prefix matches the character string, a file list having the existing file name as a start point is extracted, and
    when the determination means determines that there is no file name that exactly matches or prefix matches the character string, a file list is extracted in which a file name present next to the character string in the sorted file name group becomes the start point.

6. A method of extracting a desired file list from a plurality of stored files and sending the file list to a client, comprising:
    acquiring the number of files to be displayed and start point information identifying a start point of a file list to be extracted;
    extracting a file list on the basis of the acquired number of files and start point information from files stored as a partitioned data set in a storage device;
    calculating the numbers of preceding files stored before the extracted file list and succeeding files stored after the extracted file list;
    sending the client the calculated numbers of preceding and succeeding files and the extracted file list;
    storing, in a cache memory, a total file list in which file names of files stored as a partitioned data set in the storage device are sorted; and
    wherein a file list is extracted from the cache memory based on the number of files and start point information acquired.

7. The method according to claim 6, wherein when an update instruction of the cache memory is acquired in addition to the number of files and start point information acquired, a total file list in which the file names of the files stored as the partitioned data set in the storage device are sorted again and stored in the cache memory.

8. The method according to claim 6, wherein when the first file name in the file list and information indicative of forward search are acquired as start point information, a new file list is extracted based on the acquired start point information, and the extracted file list is sent to the client.

9. The method according to claim 6, wherein when the last file name in the file list and information indicative of backward search are acquired as start point information, a new file list is extracted based on the acquired start point information, and the extracted file list is sent to the client.

10. The method according to claim 6, further comprising:
    determining, when a character string is included in the start point information, whether there is a file name that exactly matches or prefix matches the character string,
    wherein when it is determined that there is a file name that exactly matches or prefix matches the character string, a file list having the existing file name as a start point is extracted, and
    when it is determined that there is no file name that exactly matches or prefix matches the character string, a file list is extracted in which a file name present next to the character string in the sorted file name group becomes the start point.

11. A computer program product comprising a computer-readable storage device having encoded thereon a computer-executable program of instructions for extracting a desired file list from a plurality of stored files and sending the file list to a client, the computer executable program of instructions comprising:
    program instructions for acquiring the number of files to be displayed and start point information identifying a start point of a file list to be extracted;
    program instructions for extracting a file list corresponding to the acquired number of files and start point information from files stored as a partitioned data set in a storage device;
    program instructions for calculating the numbers of preceding files stored before the extracted file list and succeeding files stored after the extracted file list;
    program instructions for sending the client the calculated numbers of preceding and succeeding files and the extracted file list program instructions for determining whether there is a file name that exactly matches or prefix matches the character string;

program instructions for, when there is a file name that exactly matches or prefix matches the character string, extracting a file list having the existing file name as a start point; and program instructions for, when there is no file name that exactly matches or prefix matches the character string, extracting a file list in which a file name present next to the character string in the sorted file name group becomes the start point, wherein a character string is included in the start point information and file names of files stored as a partitioned data set are sorted.

12. The computer program product according to claim 11, wherein when the first file name in the file list and information indicative of forward search are acquired as start point information, the program instructions for extraction extracts a new file list based on the acquired start point information.

13. The computer program product according to claim 11, wherein when the last file name in the file list and information indicative of backward search are acquired as start point information, the program instructions for extraction extracts a new file list based on the acquired start point information.

* * * * *